United States Patent [19]

Passaretti-Miscia

[11] Patent Number: 4,863,889
[45] Date of Patent: Sep. 5, 1989

[54] HIGH SURFACE AREA RHENIUM SULFIDE HYDRODESULFURIZATION CATALYSTS PREPARED BY AN AQUEOUS TECHNIQUE AND A PROCESS FOR USING THEM

[75] Inventor: June D. Passaretti-Miscia, Liberty Corner, N.J.

[73] Assignee: Exxon Research and Engineering Company, Florham Park, N.J.

[21] Appl. No.: 287,435

[22] Filed: Dec. 20, 1988

Related U.S. Application Data

[63] Continuation of Ser. No. 103,662, Oct. 2, 1987, abandoned.

[51] Int. Cl.$^4$ .................. B01J 27/02; B01J 21/18
[52] U.S. Cl. .................. 502/216; 502/182; 502/183
[58] Field of Search .................. 502/216, 182, 183

[56] References Cited

U.S. PATENT DOCUMENTS 4,308,171 12/1981 Dines et al. .................. 502/167
4,368,115 1/1983 Chianellie et al. .................. 502/215

FOREIGN PATENT DOCUMENTS 358180 10/1931 United Kingdom .................. 502/216
362354 12/1931 United Kingdom .................. 502/216
1011696 12/1965 United Kingdom .................. 502/216

OTHER PUBLICATIONS

A Bibliography on the Catalytic Applications of Rhenium (1930–1967), Corrigan et al, Cleveland Refractory Metals Division, Chase Brass & Copper Co., pp. 13, 14, 21 ∝ 23, 26, 28–29, 36 and 41–43, 10/22/1969.

Primary Examiner—H. M. S. Sneed
Assistant Examiner—Chung K. Pak
Attorney, Agent, or Firm—Deborah L. Mellott; Jay Simon

[57] ABSTRACT

This invention relates to a process for the preparation of high surface area rhenium sulfide hydrodesulfurization catalysts and to a process of using such catalysts for hydrotreating, particularly hydrodesulfurizing heavy hydrocarbons. The catalyst may be supported during use. They are preferably made using an aqueous procedure for forming the solid $ReS_{2+}$ precursor. The precursor is then heated for a period of time in substantially pure $H_2S$.

16 Claims, 3 Drawing Sheets

HIGH SURFACE AREA RHENIUM SULFIDE HYDRODESULFURIZATION CATALYSTS PREPARED BY AN AQUEOUS TECHNIQUE AND A PROCESS FOR USING THEM

This is a continuation of application Ser. No. 103,662 filed Oct. 2, 1987, now abandoned.

FIELD OF THE INVENTION

This invention relates to a process for the preparation of high surface area rhenium sulfide hydrodesulfurization catalysts and to a process of using such catalysts for hydrotreating, particularly hydrodesulfurizing heavy hydrocarbons The catalyst may be supported during use. They are preferably made using an aqueous procedure for forming the solid $ReS_{2+x}$ precursor. The precursor is then heated for a sufficient period of time in a stream of substantially pure $H_2S$ to form the catalyst.

BACKGROUND OF THE INVENTION

The petroleum industry is increasingly turning to coal, tar sands, heavy crudes and distilled residual oils as sources for feedstocks. Feedstocks derived from these heavy materials often contain more sulfur and nitrogen than feedstocks derived from more conventional crude oils. They are commonly referred to as being dirty feeds. These feeds require a considerable amount of upgrading before being introduced into processes which make lighter products such as fuel oil or gasoline. Such upgrading or refining generally is accomplished by the hydrotreating processes which are well known in the petroleum industry.

Hydrotreating processes may require the step of treating the hydrocarbon with hydrogen and usually a catalytic material to hydrogenate aromatics and other unsaturates to form aliphatic compounds, or to remove unwanted components or compounds such as nitrogen or sulfur bearing compounds, or to convert unwanted components into innocuous or less undesirable compounds. Hydrotreating may be applied to a wide variety of feedstocks, e.g., solvents; light, middle or heavy distillate feeds and residual feeds; or fuels. In hydrorefining relatively light feeds, the feed are treated with hydrogen often to improve odor, color, stability, or combustion characteristics. Unsaturated hydrocarbons are often hydrogenated to saturation. Sulfur- and nitrogen-bearing compounds are occasionally removed as part of such treatments. In the treatment of catalytic cracking feedstocks, the cracking quality of the feedstock is generally improved by a prior hydrotreating step such that elemental carbon yield is reduced and gasoline yield is increased. In the hydrodesulfurization ("HDS") of heavier feedstocks, or residua, the sulfur compounds are hydrogenated and cracked. Carbon-sulfur bonds are broken, and the sulfur, for the most part, is converted to hydrogen sulfide which is removed in gaseous form from the process. Hydrodenitrogenation ("HDN"), to some degree, also accompanies hydrodesulfurization reactions.

Catalysts which are most commonly used for hydrotreating reactions include materials such as cobalt molybdate on alumina, nickel on alumina, cobalt molybdate promoted with nickel, nickel tungstate, etc. Molybdenum sulfide is also widely used to upgrade oils containing sulfur and nitrogen compounds by catalytically removing such compounds in the presence of hydrogen.

The use of various rhenium and sulfur containing catalysts in the hydrodesulfurization of heavy feedstocks is known. For instance, U.S. Pat. No. 3,663,431, to Wagner, issued May 16, 1972, suggests the use of rhenium disulfide as a catalyst in the HDS of various heavy hydrocarbons. U.S. Pat. Nos. 4,308,171 and 4,368,115 suggest nonaqueous preparations of rhenium sulfides and that rhenium sulfides may be suitable as HDS catalysts.

U.S. Pat. No. 4,299,892 discloses a layeredsheet configuration of dichalcogenides of Group IVb, Vb, molybdenum, and tungsten.

U.S. Pat. No. 3,509,213 discloses a rhenium sulfide catalyst useful in the reductive alkylation of aromatic amino and nitro compounds.

None of these references show $ReS_{2+x}$ where x is $>0$ and $\leq 2$ and where the materials have a specific surface area of 40 $m^2/gm$ or greater and are amorphous to X-ray. None of the catalysts of these references is prepared by the aqueous preparation of the catalyst of the present invention or has an HDS activity as high as does the catalyst of the invention.

SUMMARY OF THE INVENTION

The present invention relates to catalysts suitable for use in hydrotreating processes. The catalysts are made by reacting an aqueous solution of a rhenium-containing compound, preferably $Re_2O_7$ or $(NH_4)ReO_4$, in an acidic buffered solution with $H_2S$ to produce a rhenium sulfide precursor. The reaction conditions in that precipitation reaction are believed to be critical in producing an active catalyst. The pH of the solution must be held in the narrow range between about 4.0 and about 4.5. The $ReO_4^-$ per milliliter of water ratio should preferably be held in the narrow limits between 0.1 g/ml and 0.15 g/ml. The black precipitate which forms may then be filtered and preferably rinsed with deionized water The recovered black solids must then be treated with either a substantially pure hydrogen sulfide stream or one containing a high percentage of hydrogen sulfide (and no other reductants), as well as inert gases such as neon, argon, or nitrogen. Apparently the solids produced by the aqueous synthesis require a hydrogen sulfide treatment of from about 1 to about 4 hours at about 425° C. to about 725° C., preferably at 500° C. to 600° C., to produce the active HDS catalyst of the invention. The final catalyst has a form of $ReS_{2+x}$ where x is $>0$ but $\leq 1$. The precursor is substantially amorphous to X-ray crystallographic measurements and has a specific surface area of about 40 $m^2/gm$ or greater.

DESCRIPTION OF THE INVENTION

As noted above, this invention deals with a bulk or supported rhenium sulfide containing hydroprocessing catalyst having a high initial surface area prior to treatment with $H_2S$.

Figure 1:
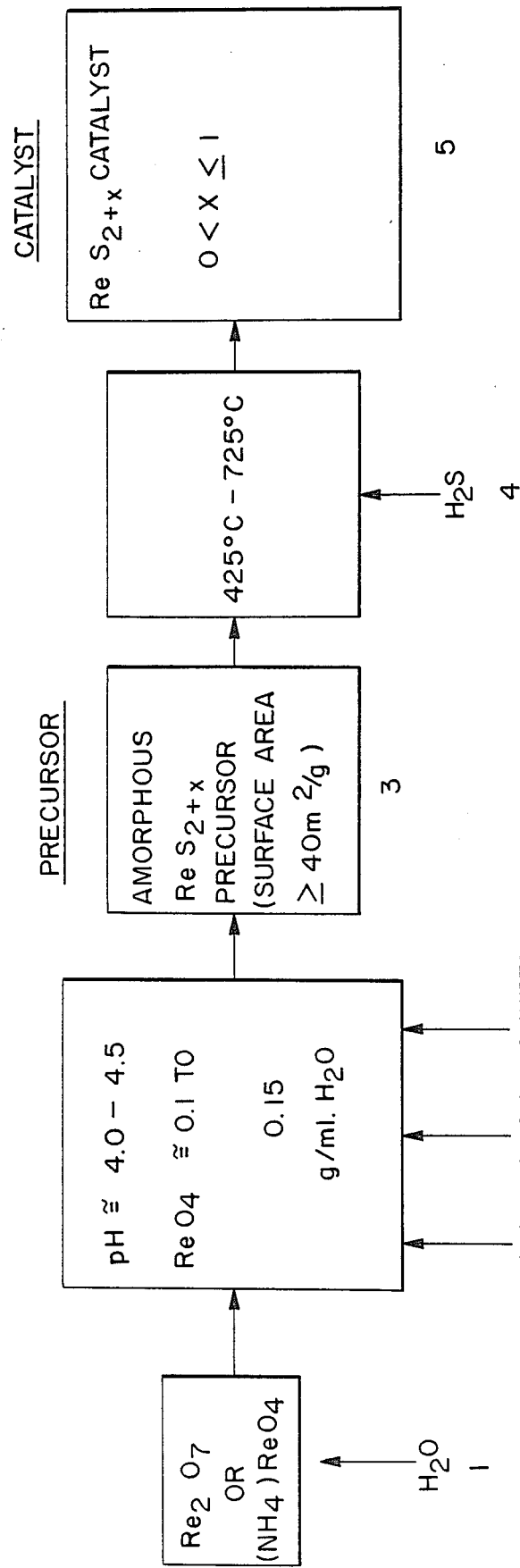
FIG. 1 is a schematic representation of the process steps required in producing the catalyst of the instant invention.

The process steps of producing the catalysts are summarized in FIG. 1. Referring to FIG. 1, the catalysts are made by taking an aqueous solution of a rhenium-containing compound, preferably $Re_2O_7$ or $(NH_4)ReO_4$ (1), treating it in an acidic buffered solution, preferably acetic acid and NaOH, and purging it with $H_2S$(2) and heating to produce a rhenium sulfide precursor (3). The reaction conditions in that precipitation reaction are believed to be critical in producing an active catalyst The pH of the solution must be held in the narrow range between about 4.0 and about 4.5. The $ReO_4^-$ per milliliter of water ratio preferably should be held in the narrow limits between 0.1 g/ml and 0.15 g/ml, more preferably at 0.12 g/ml. The black precipitate which forms may then be separated, as for example by filtering, and is preferably rinsed with deionized water. The recovered black solids, the precursor (3), must then be treated with either a substantially pure hydrogen sulfide stream or one containing a high percentage of hydrogen sulfide (and no other reductants), as well as inert gases such as neon, argon, or nitrogen (4). Apparently the solids produced by the aqueous synthesis require a treatment with $H_2S$, preferably substantially pure $H_2S$. The $H_2S$ stream may also contain inert gases, e.g. neon, argon, or nitrogen (and no other reductants), but normally contains at least about 90% $H_2S$, preferably 95% $H_2S$. The treatment is for a sufficient time period to form the catalyst, preferably about 1 to about 4 hours, at about 425° C. to about 725° C., more preferably at 500° C. to 600° C., to produce the active HDS catalyst of the invention. The final catalyst has a form of $ReS_{2+x}$ where x is $>0$ but $\leq 1$. The precursor is substantially amorphous to X-ray crystallographic measurements and has a specific surface area of about 40 m²/gm or greater.

The catalyst material having the form $ReS_{2+x}$, where $1 \geq x > 0$, may be combined with a support material. The support may be any acidic, basic, or mixed oxide type materials, preferably alumina, silica, silica-alumina, titania, vanadia, niobia, or any other transition metal oxide or a zeolite. Alternatively, the support may be a transition metal sulfide, preferably molybdenum sulfide. The support may also be carbon, preferably active carbon or graphitic carbon, or carbon sulfide of the form $C_xS$. This combined $ReS_{2+x}$/support composition functions as an active hydrodesulfurization catalyst.

The inventive catalysts disclosed herein are to be used in processes for hydrotreating, particularly hydrodesulfurizing, sulfur-bearing hydrocarbon oil streams. The procedures are well known, and the following processes are offered for exemplary purposes. In one embodiment of the process, small particles of the inventive catalyst are introduced into a hydrocarbon stream containing sulfur compounds. These sulfur bearing hydrocarbon streams typically have boiling points above about 400° F. and less than about 1050° F. and may contain up to 5% by weight of sulfur The catalyst is included in the feedstock oil in an amount sufficient to provide a ratio of Re:S (in hydrocarbon) of between about 0.0014/1 and 0.14/1; preferably 0.01 to 0.1. The reaction zone can be at a partial pressure of hydrogen between about 100 and 1500 psia; preferably between about 300 and 700 psia. The total pressure in the reaction zone is between 150 and 1600 psia; preferably between 350 and 800 psia. The reaction temperature is controlled between about 200° C. and 390° C.; preferably 300° C. and 360° C.

EXAMPLE 1

Preparation of High Surface Area Precursor

A sample of $(NH_4)ReO_4$ was added to water in the ratio of 0.13 gm $ReO_4^-$ per ml water. For every 7.5 ml $H_2O$, 1 ml acetic acid was added. For every 3.4 ml acetic acid, approximately 1 g NaOH was added until the pH was 4.2. The solution was purged with $H_2S$ for 30 minutes, then heated to 50° C. for six hours while continuing $H_2S$ purge (50 cc/min). After six hours, the solid product (black) was filtered out of solution by means of vacuum filtration, collected on a fritted funnel and washed with hot $H_2O$. The solid was then soxhletted with $H_2O$ for 24-48 hours to remove any unreacted $(NH_4)ReO_4$. The solid was then dried in a vacuum at room temperature overnight.

The BET surface area of the precursor product was 45.0 m²/gm.

The precursor product was subjected to thermogravimetric analysis (TGA) under argon for a temperature range of room temperature to 825° C. The heating rate was 10° C./minute. The product was subjected to powder X-ray diffraction measurements before and after the TGA. Before the TGA, the X-ray diffraction was substantially amorphous. Initial composition of the high surface area rhenium sulfide was $ReS_{3.75} \cdot XH_2O$. From 0° to 200° C. the removal of weakly held $H_2O$ and volatilization of S in excess of that corresponding to $Re_2S_7$ occurred. Between 200° C. and 400° C., $Re_2S_7$ decomposes to $ReS_3$. Between 400° C. and 600° C., $ReS_3$ decomposes to $ReS_2$. The total Re:S ratio was $ReS_{2.43}$ at 400° C. and $ReS_{2.22}$ at 600° C. At 825° C., decomposition to $ReS_2$ was complete and crystalline $ReS_2$ could be seen in the powder diffraction X-ray pattern of the TGA product.

EXAMPLE 2

(Comparative)

Preparation of a Low Surface Area Precursor

The procedure of Example 1 was followed except that the pH of the reaction solution was maintained at 2.0 rather than 4.5.

The BET surface area of the material was 2.5 m²/gm.

The TGA of the low surface area material showed a steady decrease in weight up to 825° C., there continued to be a weight loss until the TGA experiment was stopped The Re:S stoichiometry went from $ReS_{3.21}$ at room temperature to $ReS_{1.90}$ at 825° C.

EXAMPLE 3

Preparation of HDS Catalysts

Two to three gram samples of the rhenium sulfide obtained from Example 1 (the high surface area precursor) or Example 2 (the low surface area precursor) were placed in a furnace tube and purged with nitrogen for thirty minutes before exposing the solid to 100% $H_2S$ or 15% $H_2S/H_2$ (as in the case of a second batch of low surface area precursor to determine what effect, if any, concentration of $H_2S$ in the catalyst pretreatment gas has upon catalyst activity). $H_2S$ or 15% $H_2S/H_2$ was purged through the furnace tube and the furnace was brought up to its prescribed temperature for a period of 90 minutes. The samples were treated in this respective manner at 350°, 400°, 450°, 500°, 600°, 700° and 1000° C. All samples were cooled under the heat treatment gas (100% H₂S or 15% H₂S/H₂) to 100° C. where they were further cooled to room temperature under $N_2$.

Figure 2:
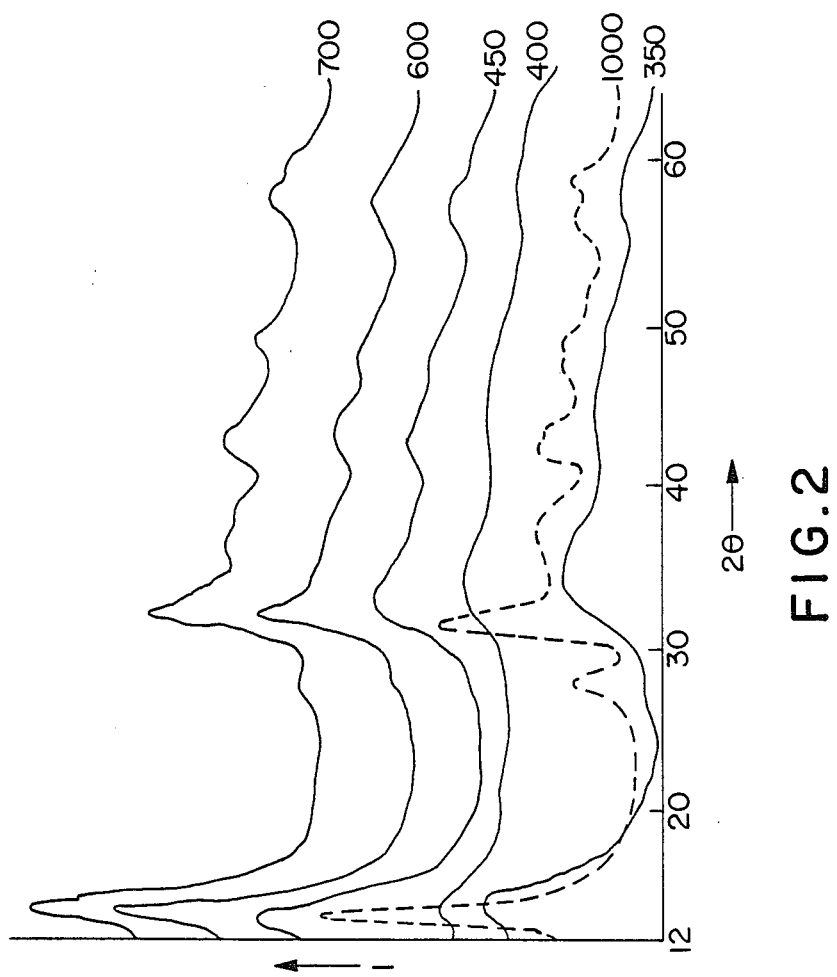
FIG. 2 shows the X-ray diffraction patterns of the inventive catalyst as a function of the heattreating temperature.

The various X-ray diffraction patterns for the $H_2S$-treated precursors (now called catalyst), produced at each of the noted temperatures, are shown in FIG. 2. At temperatures above about 400° C., some incomplete crystallization of $ReS_2$ is apparent However, even at 1000° C., the crystallization is not complete.

EXAMPLE 4

HDS Activity Evaluation

The catalytic activity of the rhenium sulfide samples which were heat treated in Example 3 were determined for the hydrodesulfurization (HDS) of dibenzothiophene (DBT) in decalin. The DBT (Aldrich Chemical Company) (Matheson) were used without further purification. The reactor feed was prepared by dissolving 4.4 g of DBT in 1000 cc of hot decalin. This solution contained about 5 wt. % DBT or 0.8 wt. % sulfur. The HDS evaluations were done in a Carberry type autoclave. The reactor was designed to allow a constant flow of 100 cc $H_2$/min during the reaction and also to permit liquid sampling during the reaction. The autoclave was fitted to a condenser so that despite $H_2$ flow, all organic materials were retained.

The catalyst (1 g, 20/40 mesh-pressed powder) was diluted with 1/16" porcelain beads and placed into a 10 cm³ basket. At ambient temperatures, an $H_2$ flow rate of 100 cc/min was established and the reactor was charged with feed. The pressure was set to 450 psi and the reactor temperature raised to 350° C. Liquid sampling commenced when reactor temperature reached 350° C. Samples were taken every ½ hour and were analyzed with a Perkin Elmer 900 gas chromatograph using a flame ionization detector. In order to obtain rate constants, the concentrations of the three products (biphenyl, cyclohexylbenzene and bicyclohexane) which result from the hydrodesulfurization of DBT were summed and plotted against time. Conversions of DBT <30% were used. In this regime, essentially linear concentration vs. time plots will be obtained even if first-order dependence on DBT concentration prevails. Thus, even in the absence of knowledge of the true reaction order under our conditions, the slopes of the linear concentration vs. time plots which obtained sufficed to provide relative rate constants for these catalysts.

Table I below shows the reaction rate and surface area of the precursors which had been heat treated in 100% $H_2S$ (Set A—high surface area precursor and Set B—low surface area precursor) or 15% $H_2S/H_2$ (Set C—low surface area precursor only).

Figure 3:
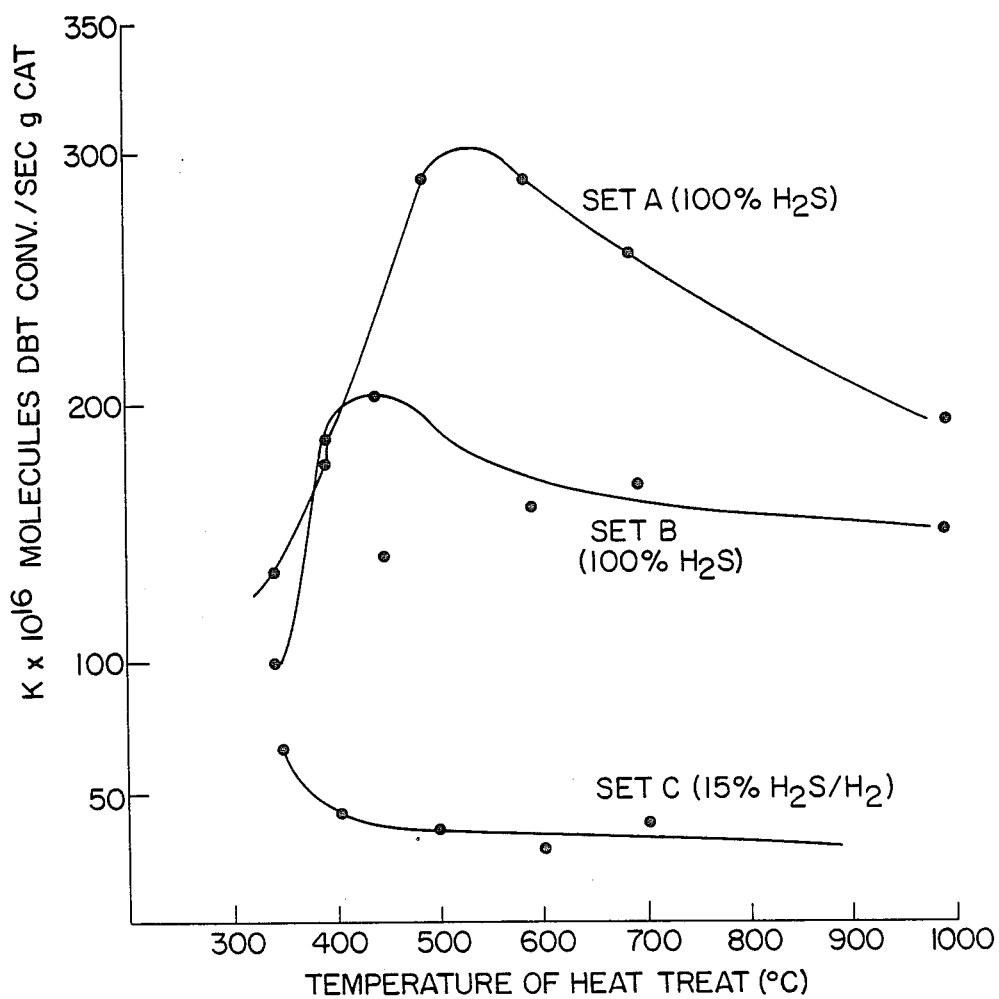
FIG. 3 shows the HDS activity of various catalysts as functions of the heat-treat temperature and method of preparation.

The HDS activity for these three materials is portrayed in FIG. 3. The clearly superior HDS activity for the Set A material heat treated between about 425° C. and about 725° C. is apparent both from Table I and from FIG. 3, which show catalytic activity as measured by the activity rate constant for the hydrodesulfurization of dibenzothiophene (DBT) in decalin of greater than about $200 \times 10^{16}$ molecules DBT conv/sec g catalyst.

Having thus described the invention and provided examples of its operation, it should be apparent that various modifications and changes can be made to the invention as claimed below without departing from the spirit of the invention.

TABLE I

| Precursor | Heat treat temperature | % H₂S in heat treat | Surface area (m²/gm) | | $K \times 10^{16}$ molecules DBT conv/sec g cat. |
| --- | --- | --- | --- | --- | --- |
| | | | after heat treat | after HDS evaluation | |
| Set A | 350 | 100 | 23.3 | 23.8 | 136 |
| (High | 400 | 100 | 20.0 | 20.8 | 128 |
| Surface | 450 | 100 | 20.3 | 19.3 | 231 |
| Area) | 500 | 100 | 18.4 | 21.0 | 286 |
| | 600 | 100 | 16.0 | 25.0 | 286 |
| | 700 | 100 | 18.8 | N.A. | 259 |
| | 1000 | 100 | 17.5 | 22.3 | 191 |
| Set B | 350 | 100 | 3.6 | 4.6 | 99 |
| (Low | 400 | 100 | 4.0 | 5.6 | 185 |
| Surface | 450 | 100 | 3.4 | 5.4 | 204 |
| Area) | 500 | 100 | 3.1 | 4.7 | 183 |
| | 600 | 100 | 3.1 | 5.5 | 161 |
| | 700 | 100 | 3.0 | 6.8 | 169 |
| | 1000 | 100 | 9.2 | 14.0 | 148 |
| Set C | 350 | 15 | 3.7 | 4.1 | 67 |
| (Low | 400 | 15 | 6.6 | 6.1 | 42 |
| Surface | 450 | 15 | 4.3 | 5.0 | 141 |
| Area) | 500 | 15 | 7.1 | 5.9 | 36 |
| | 600 | 15 | 2.2 | 2.3 | 28 |
| | 700 | 15 | 2.2 | 3.2 | 39 |
| | 1000 | 15 | — | — | ** |

** This material was not HDS evaluated because it was found to have been reduced to be metal during 15% $H_2S/H_2$ pretreatment. This was determined by examination of the X-ray diffraction pattern.

What is claimed is:

1. A process for preparing a hydrotreating catalyst comprising
   (a) forming an aqueous solution of a rhenium containing compound;
   (b) treating the aqueous solution with an acidic buffered solution to obtain a pH of about 4.0 to about 4.5;
   (c) purging the buffered solution with $H_2S$ and heating the resulting solution to form a precipitate;
   (d) recovering the precipitate and treating the precipitate with $H_2S$ at a temperature ranging from about 425° to 725° C. to form the catalyst.

2. The process of claim 1 wherein the resulting catalyst has a surface of at least 40 m²/gm and is amorphous to X-ray.

3. The process of claim 1 wherein the rhenium compound of (a) is $(NH_4)ReO_4$ or $Re_2O_7$.

4. The process of claim 1 wherein the acidic buffered solution of (b) comprises acetic acid and NaOH.

5. The process of claim 1 wherein the catalyst is combined with a support.

6. The process of claim 5 wherein the support is selected from the group consisting of an acidic or mixed metal oxide, a transition metal sulfide, and carbon.

7. The process of claim 5 wherein the support comprises alumina.

8. The process of claim 5 wherein the support comprises molybdenum sulfide.

9. The process of claim 5 wherein the support comprises activated carbon.

10. The process of claim 5 wherein the support comprises graphitic carbon.

11. A process for preparing a hydrotreating catalyst having a surface area of at least 40 in$^2$/gm and amphorous to X-ray comprising (a) forming an aqueous solution of $NH_4ReO_4$ or $Re_2O_7$, (b) treating the aqueous solution with an acidic buffered solution to obtain a pH of about 4.0 to about 4.5, (c) purging the buffered solution with a $H_2S$ containing stream and heating the solution to form a precipitate, (d) recovering the precipitate and treating the precipitate with $H_2S$ at a temperature of about 425° to 725° C. for about 1–4 hours.

12. The process of claim 11 wherein the hydrogen sulfide containing stream of (c) consists essentially of hydrogen sulfide and inert gas.

13. The process of claim 11 wherein the catalyst is combined with a support.

14. The process of claim 13 wherein the support comprises alumina.

15. The process of claim 13 wherein the support comprises molybdenum sulfide.

16. The process of claim 13 wherein the support comprises activated carbon or graphite carbon.

* * * * *